Sept. 1, 1925.
R. W. ACHTERBERG
CALF MUZZLE
Filed April 15, 1924
1,551,777
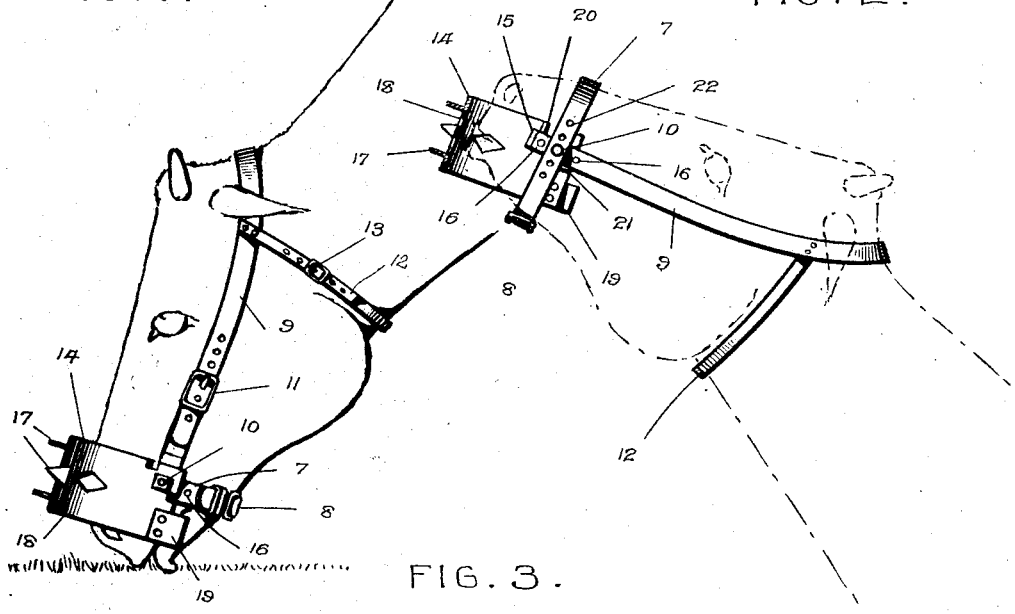
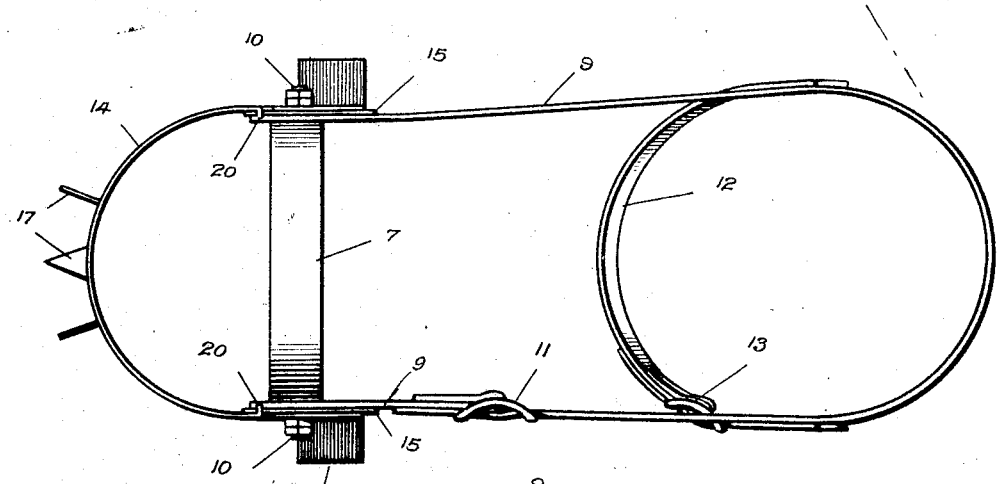
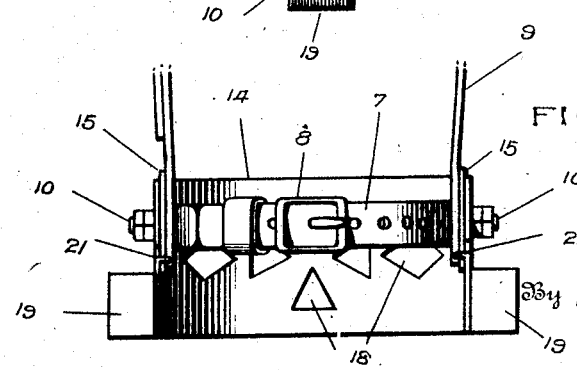
Inventor:
R. W. ACHTERBERG, Patented Sept. 1, 1925.

1,551,777

UNITED STATES PATENT OFFICE.

ROY W. ACHTERBERG, OF AMHERST, COLORADO.

CALF MUZZLE.

Application filed April 15, 1924. Serial No. 706,707.

*To all whom it may concern:*

Be it known that I, ROY W. ACHTERBERG, a citizen of the United States, residing at Amherst, in the county of Phillips and State of Colorado, have invented certain new and useful Improvements in Calf Muzzles, of which the following is a specification, reference being had therein to the accompanying drawing.

The present invention relates to weaning devices for calves and other young animals, and aims to provide a novel and improved muzzle for that purpose.

Another object of the invention is the provision of such a device comprising a head stall and a guard or shield constructed and connected in a novel manner whereby the guard or shield is automatically positioned to permit the animal to graze, but to prevent is from obtaining food when it raises its head.

A further object of the invention is the provision of such a device which is simple in construction and operation, and which does not have complicated or cumbersome parts that might get out of order or produce objections.

With the foregoing and other objects in view, which will be apparent as the description proceeds, the invention resides in the construction and arrangement of parts as hereinafter described and claimed, it being understood that changes can be made within the scope of what is claimed, without departing from the spirit of the invention.

The invention is illustrated in the accompanying drawing, wherein—

Figure 1 is a side elevation of the improved muzzle as applied, showing the animal grazing.

Fig. 2 is a median vertical section of the device showing the guard or shield disposed across the mouth of the animal when it raises its head.

Fig. 3 is a plan view of the device, on an enlarged scale, with the parts in the position as seen in Fig. 2.

Fig. 4 is a rear view, on an enlarged scale, with the parts in the position as seen in Fig. 1, a portion of the head stall being broken away.

A head stall is provided for attaching the device, and comprises a band 7 of leather or other suitable material to embrace the animal's head, and having a buckle 8 at the bottom for adjusting the size of the band. A head strap 9 has its terminals secured to the sides of the band 7 by the pivot bolts 10, and said strap extends along the cheeks of the animal's head and over the neck behind the ears and horns to hold the band 7 in place. A throat strap 12 has its terminals secured to the strap 9 and extends under the throat behind the lower jaw, for holding the strap 9 on the head. The straps 9 and 12 have the adjusting buckles 11 and 13 whereby said straps can be lengthened and shortened, so that the head stall will fit the animal properly.

The shield or guard 14 is composed of sheet metal, and is curved so as to extend over and partly around the mouth and nostrils of the animal, and said guard is pivotally supported from the head stall. Thus, the guard 14 pivotally engages the pivot bolts 10 near the corners between the ends and upper edge of said guard, so that the guard can swing about a transverse axis across the mouth and nostrils. The terminal portions of the guard are disposed at the outer sides of the band 7 and strap 9, with the terminals of the strap 9 between the band 7 and guard. Sheet metal bearing pieces 15 are secured, by rivets 16 or otherwise, to the outer sides of the straps 9 for the contact of the guard 14 which overlaps said bearing pieces.

The guard 14 has spurs or prods 17 struck outwardly therefrom at the intermediate portion of said guard so as to repel the mother. Said guard also has the openings 18.

In order to maintain the guard in a forwardly extending position, as seen in Figs. 1 and 2, weights 19 are secured by rivets or otherwise to the corner portions of the guard between the ends and lower edge of the guard, below the pivot bolts 10. Said weights counterbalance the forward portion of the guard, thereby supporting the guard in the forwardly extending position and preferably slightly inclined.

The swinging movement of the guard and head stall relatively to one another is limited. Thus, lugs or stops 20 are struck inwardly from the upper edge portion of the guard 14 to contact with the bearing pieces 15, and similar lugs or stops 21 are struck inwardly from the end portions of the guard to also contact with said pieces. The bearing pieces 15 are disposed between the lugs or stops 20 and 21.

When the animal lowers its head to eat off the ground, as seen in Fig. 1, the guard 14 remains in forwardly extending position, so as to be above the nostrils, thereby permitting the animal to graze or eat off the ground without interference. When the head is raised, as seen in Fig. 2, the guard remains in the same position, the head stall turning within the guard, so that the mouth of the animal is moved or brought behind the guard, thereby preventing the animal from obtaining food with its head up, as seen in Fig. 2. The lugs or stops 20 and 21 define the limits of movement of the guard and head stall 12 relatively to one another, so as to prevent the parts from swinging too far and to also prevent the guard from striking the head of the animal.

The strap or band 7 is contracted so that it will not slip rearwardly on the head, thereby keeping the guard spaced from the mouth and nostrils of the animal, even though the strap 9 is tightened on the head. The strap or band 7 is provided, at least at the side, with a row of apertures 22 for the reception of the corresponding pivot bolt 10, in order that the pivot bolts 10 can be adjusted upwardly and downwardly at the sides of the head in connection with the adjustment of the band 7 by the use of the buckle 8.

Having thus described the invention, what is claimed as new is:—

1. An animal muzzle comprising a head stall having a band, a strap and pivots connecting said strap and band and adjustable in the band, a guard pivotally engaging said pivots to be disposed across the mouth of the animal, and a weight secured to said guard to maintain it in forwardly extending position.

2. An animal muzzle comprising a head stall including a band, a strap, pivots connecting said strap and band, and metal bearing pieces secured to the strap, a curved guard to be disposed across the animal's mouth having its end portions overlapping said pieces and pivotally engaging said pivots, said guard having stops to contact with said pieces for limiting the relative swinging movements of the guard and head stall in opposite directions, and a weight secured to the guard to maintain it in forwardly extending position.

In testimony whereof I hereunto affix my signature.

ROY W. ACHTERBERG.